United States Patent Office 3,433,696
Patented Mar. 18, 1969

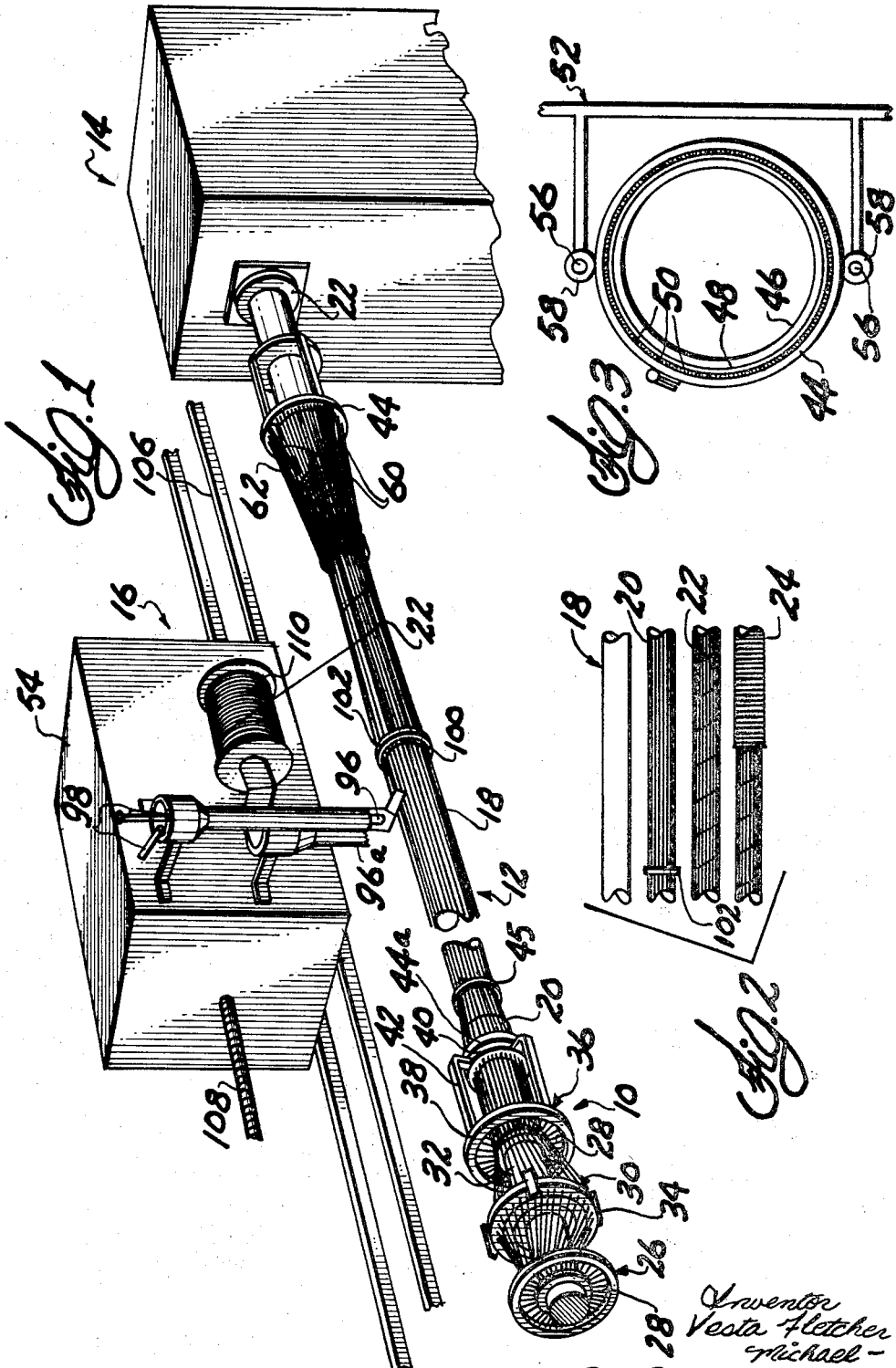

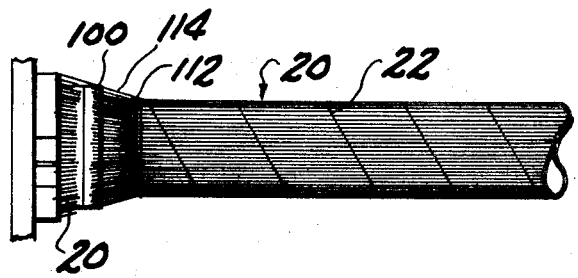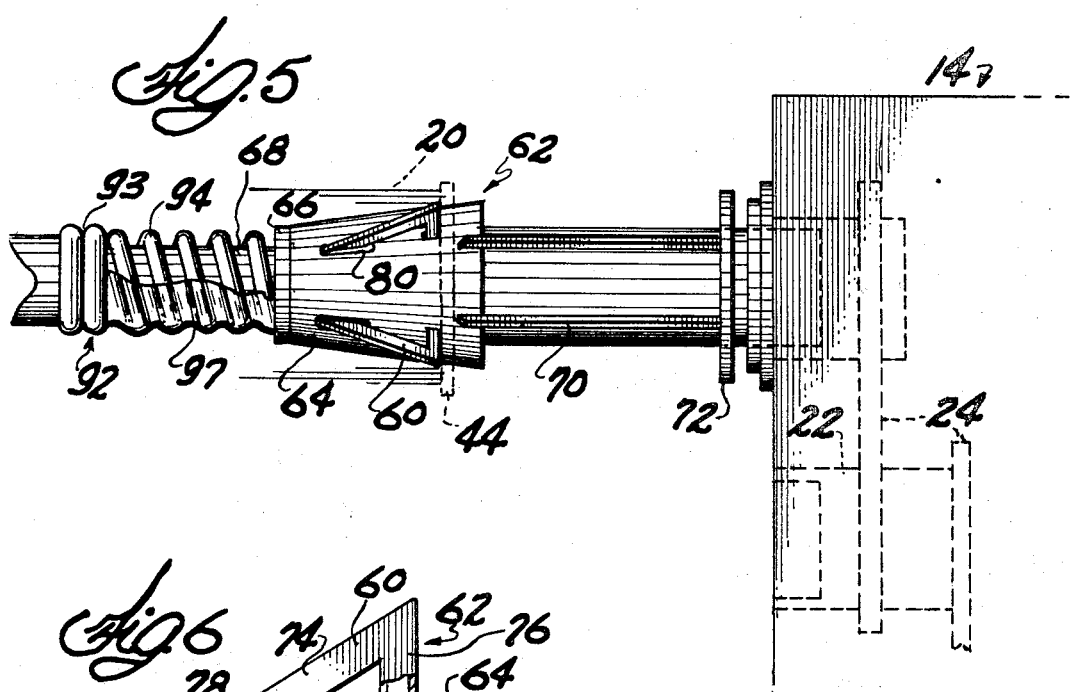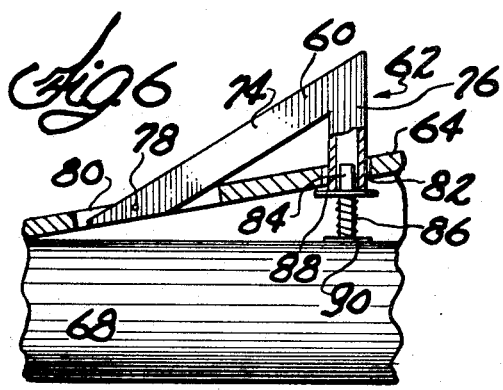

3,433,696
APPARATUS FOR MAKING FILAMENT
REINFORCED PLASTIC PIPE
Vesta Fletcher Michael, Wichita, Kans., assignor, by mesne assignments, to Koch Industries, Inc., Wichita, Kans., a corporation of Kansas
Filed Oct. 15, 1965, Ser. No. 496,489
U.S. Cl. 156—425
Int. Cl. F16l 9/12, 9/14, 9/22
5 Claims

ABSTRACT OF THE DISCLOSURE

Filament reinforced plastic pipe is composed of a layered arrangement or reinforcements such as glass roving filaments arrangeed substantially parallel and transversely to the pipe longitudinal axis and is imbedded in a resin matrix while under tension to provide enhanced strength. To avoid the loss of the parallel arrangement of the filaments as a result of the centrifugal forces to which the central portions of the filaments are subjected to during the formation of the pipe, an apparatus and method is provided for retaining the central portions of the reinforcements in their desired relationship to the underlying mandrel on which the pipe is being formed.

This invention relates to a method and apparatus for forming plastic pipe, and more particularly pertains to a method and apparatus for producing plastic pipe which is of exceptional strength.

It has been found that in the formation of filament-reinforced plastic pipe, a layered arrangement of the reinforcements, such as glass roving filaments, substantially parallel and transversely to the pipe longitudinal axis results in excellent pipe strength. The roving in such "two angle" orientation is able to react directly to tensile stresses exerted along the longitudinal axis of the pipe, as well as to burst forces exterted against the pipe walls substantially transverse to the pipe longitudinal axis.

The pipe strength is enhanced still further if the roving is embedded in the resin matrix while under tension. The tension of the filaments embedded in the cured resin continuously functions to retain the pipe as a strong unitary mass and opposes any force tending to destroy the integrity of the pipe. The improved apparatus and method hereinafter described are directed to the efficient tensioning of filamentous reinforcements in a plastic pipe while the plastic component of the pipe is being cured.

The reinforced pipe made pursuant to this invention is formed on a rotatable mandrel. The longitudinal filaments formed about the mandrel in the normal course of pipe formation rotate with the mandrel. These filaments, if anchored at only their opposed end limits adjacent the mandrel ends, have their central portions subjected to centrifugal forces. These forces tend to stretch the filaments, loosen their attachment to the opposed anchors and destroy the parallel arrangement of the filaments.

In accordance with the invention hereinafter described in detail, a method for retaining the central portions of the reinforcements in desired relation with the underlying mandrel is described. Such retention obviates the foregoing difficulties existing when centrifugal forces are exerted on free and unbound central portions of the longitudinal filaments.

Also hereinafter described is apparatus for forming reinforced plastic pipe in which the tension imparted to longitudinal reinforcements thereof is accurately controlled thereby assuring reinforced pipe of uniform quality and maximum strength.

It is an object of this invention, therefore, to provide a filament-reinforced plastic pipe which affords maximum strength per unit weight.

It is another object of this invention to provide apparatus for imparting precise predetermined tension in longitudinal filamentous reinforcements embodied in a reinforced plastic pipe.

It is a further object of this invention to provide apparatus for forming a filament-reinforced plastic pipe which apparatus is extremely compact in size and efficiently performs a plurality of steps in a limited amount of time.

The above and other objects of this invention will become more apparent from the following detailed description when read in the light of the accompanying drawing and appended claims.

In one embodiment of this invention a rotatable mandrel assembly is provided having a stop for a longitudinal roving assemblage resiliently mounted adjacent one end limit thereof. The mandrel assembly is mounted at one end limit in a rotatable bearing disposed adjacent apparatus for feeding and rendering taut a plurality of filamentous reinforcements which are adapted to be incorporated in a cured resin pipe to be formed about a main mandrel portion of the assembly. The opposite end limit of the mandrel assembly is mounted in a rotatable socket of a mandrel drive unit adapted to be moved into desired spaced relation with the rotatable bearing.

A plurality of glass roving ends extending from roving spools are then clamped about the periphery of an anchor ring concentrically arranged with the mandrel. The anchor ring is moved along the length of the mandrel until it engages the resiliently mounted ring stop disposed adjacent the mandrel drive unit. The anchor ring forms a sock-like member composed of parallel longitudinal filaments disposed about the periphery of the mandrel in the process of moving along the mandrel length.

After formation of the sock, the filaments thereof are tensioned by means of a rotatable tensioning ring. The ring uniformly takes up the slack in the filaments and pulls the anchor ring against the resiliently mounted ring stop, which is biased away from the tensioning ring, until a desired tension is imparted to the filaments.

The tensioned filaments in adidtion to passing through the tensioning ring also traverse a stationary, apertured guide ring adjacent the rotatable mandrel bearing and concentric with the rotatable mandrel. This ring together with the anchoring ring retain the filaments in parallel relation and in desired spaced relation relative to the mandrel periphery. The action of the tensioning ring pulls the slack in the filaments extending from the anchor ring through the apertured ring and winds the same about a take-up tubular portion on which the tensioning ring is mounted. The latter tubular portions straddle the tensioning rings, as will hereinafter be described in greater detail.

After desired tensioning of the filaments, the center portion of the longitudinal filament assemblage is clamped to a retention ring disposed about the mandrel center. The clamp prevents "fly out" of the central strand assemblage caused by centrifugal force exerted on the strands when the mandrle is rotated. The longitudinal filaments are then saturated with resin and tied to the mandrel surface by spiral windings, at which time the retention ring is removed. The filaments so tensioned when embodied in a cured plastic pipe provide exceptional strengths which are totally unexpected, as will also hereinafter be discussed in detail.

For a more complete understanding of this invention, reference will now be made to the drawing wherein:

FIG. 1 is a fragmentary perspective view illustrating one embodiment of the apparatus of this invention for forming a filament-reinforced resin pipe;

FIG. 2 comprises a series of fragmentary elevational views illustrating progressive filament and resin build-up on a pipe form or mandrel in the course of forming a pipe member pursuant to the method hereinafter described;

FIG. 3 is a fragmentary, elevational view illustrating on an enlarged scale, carrier means for conveying a filament anchor ring of the apparatus of FIG. 1;

FIG. 4 is a fragmentary, elevational view of a partially formed filament-reinforced resin pipe member disposed on a rotatable mandrel;

FIG. 5 is a fragmentary, elevational view illustrating the mandrel assembly of FIG. 1 joined at one end limit to a mandrel drive unit; and FIG. 6 is an enlarged, fragmentary, elevational view, partially broken away, illustrating the stop member for a filament anchor ring employed in the apparatus of FIG. 1.

Referring now more particularly to FIG. 1, apparatus is therein illustrated for forming a filament-reinforced resin pipe possessing exceptional strength characteristics. As was disclosed in my copending application Ser. No. 84,069, filed Jan. 23, 1961, now U.S. Patent No. 3,202,560, issued Aug. 24, 1965, glass roving composed of untwisted glass filaments which are embedded under tension in an epoxy resin matrix with the filaments arranged substantially parallel and transversely to the longitudinal axis of the pipe in which formed, provides startling tensile and burst strengths. Inasmuch as the filaments are desirably arranged in an untwisted condition along the longitudinal axis of the pipe member, any tensile stresses placed on the pipe are directly reacted to by the filaments without any cutting action being exerted between the filaments, because of their untwisted condition.

The glass filaments arranged in the form of spirals substantially at right angles to the longitudinal axis of the pipe also react directly to outwardly-directed burst forces emanating from the pipe interior, again without any cutting action being effected between the untwisted filaments of the glass roving reinforcements. By placing the filaments under tension prior to curing the resin matrix in which the filaments are embedded, most startling strengths result in the pipe. The longitudinal stressed filaments, when under tension, serve to support the spirals disposed thereabout, thereby increasing to a great extent the collapse strength of the pipe member.

Glass fibers, having tensile strengths of anywhere from 250,000 to 400,000 p.s.i., when bonded in a tensioned condition into a homogeneous structure by means of cured epoxy resin have provided strengths rendering such pipes suitable for applications heretofore served only by metal pipes. In addition, such reinforced resin pipes possess the obvious desirable property of corrosion resistance to fluids unable to be handled by ordinary metal pipes. Pipe members hereinafter described are therefore deemed to be particularly adapted for use in those applications in which corrosion resistance is necessary as well as strength.

In FIG. 1, the illustrated apparatus may be broken down into a feed and tensioning assembly 10 which is connected to a rotatable mandrel assembly 12. Assembly 12 is also joined at the right-hand end limit to a mandrel drive unit 14. Movably disposed along the length of the mandrel assembly 12 is a roving and resin-dispensing assembly 16.

Depending upon the service for which the final pipe product to be formed on assembly 12 is intended, the number of helical and longitudinal layers of roving reinforcements will vary. If tensile strength is of the utmost importance, the number of longitudinal roving layers will be present to the extent necessary to provide the desired tensile strength. Similarly, if the pipe is to be placed under great internal pressures, the number of layers of helical roving assemblies must be adequate to provide the desired strength.

During pipe formation, a mandrel such as mandrel 18 illustrated in FIG. 2, is coated about its external periphery with a wax parting layer. The wax enables the pipe member formed about the periphery thereof to be readily removed from the mandrel.

The first roving normally applied to the mandrel is in the form of a sock of longitudinal roving strands, such as is illustrated at 20 in FIG. 2. Care is exercised to arrange the sock about the mandrel with all filaments under a desired tension and parallel to the mandrel longitudinal axis. A resin-dispensing pass is then made along the length of the sock, by the assembly 16 illustrated in FIG. 1, so as to saturate the filaments of the longitudinal sock.

After saturation, the filaments of the sock 20 which are initially spaced from the mandrel periphery are brought against the peripheral surface of the mandrel by means of a tie-down spiral 22 having widely spaced convolutions, as illustrated in FIG. 2. Care is taken in the course of tying down the longitudinal sock 20 that all of the filaments of the longitudinal sock are maintained evenly spaced about the mandrel periphery for uniform pipe strength.

Following the application of the spiral 22, a tight spiral 24 of helical glass roving filaments is applied over the loose spiral and resin is again applied to the tight spiral to saturate the spiral filaments. Two tight spirals may be applied in succession, the second spiral being applied dry since the resin from the first spiral is normally adequate to seep through and saturate the filaments of the second spiral.

The pipe formation then continues in a desired manner until the desired number of longitudinal assemblies and spiral layers have been applied by repeating the above-described steps.

As above indicated, the longitudinal filaments of the sock 20 should be placed under tension and the filaments of the spiral layers should also be placed under tension so as to greatly enhance the ultimate strength of the pipe after the same has been formed and the resin component thereof cured.

The mandrel assembly 12 of this invention most clearly seen in FIGS. 1 and 5 comprises a metal mandrel 18 which may have holes disposed about the periphery thereof for purposes described in my copending application Ser. No. 203,386, filed June 18, 1962, now U.S. Patent No. 3,231,442, issued Jan. 25, 1966. When ready for use the mandrel 18 is coated with a wax parting layer as above mentioned in the description of FIG. 2 and inserted at one end limit in the feed and tensioning assembly 10 as illustrated in FIG. 1.

The feed and tensioning assembly 10 has a collet (not shown) which is adapted to receive the left-hand end limit of the mandrel 18. The mandrel may be rotatable with the collet as by means of a keyway, set screw, or other equivalent means. The remaining portions of assembly 10 do not rotate with the mandrel.

The right-hand end limit of the mandrel assembly 12 is received in a movable mandrel drive unit 14 possessing a number of rotatable mandrel sockets 22, more clearly seen in FIG. 5, which are driven by drive chains 24, the lowermost chain being directly driven by a motor, not illustrated. It will be apparent from FIGS. 1 and 5 that the mandrel drive unit 14 is adapted to drive a plurality of mandrel assemblies simultaneously, only one assembly being illustrated. When a plurality of mandrel assemblies are driven by the unit 14, a plurality of feed and tensioning assemblies 10 are also employed inasmuch as each mandrel assembly 12 requires its own individual feed and tensioning assembly 10.

Prior to forming a longitudinal strand assemblage 20 over a mandrel 18 utilizing the apparatus of FIG. 1, a plurality of glass roving ends are threaded through stationary feed ring 26 of the assembly 10 which possesses the spoke-like guide fingers 28 for purposes of maintaining the roving ends in separated, untangled relationship. The roving ends are desirably spaced about the periphery of the feed ring 26 so that a minimum of difficulty is encountered between the roving ends when they are subsequently pulled between the spoke-like fingers 28.

Following passage through the guide fingers 28, the roving ends are passed through apertures disposed in outer peripheral portions of rotatable tensioning ring 30; stationary feed ring 28 is immovable relative to the tubular member 32 passing thereto.

Tensioning ring 30 is readily rotatable about member 32, the rotational movement being assisted by means of finger grips 34 secured at spaced peripheral portions to the tensioning ring 30. It will be noted from FIG. 1 that tensioning ring 30 may possess two concentric series of apertures, the specific series being employed depending upon the size of the pipe which is being formed.

After passing through the apertures of the tensioning ring 30, the roving ends are threaded through a stationary guide assembly 36 composed of a large guide ring 38. Ring 38 is similar in construction to ring 26 inasmuch as it possesses similar spoke members 28 for purposes of effecting a guiding function on the roving ends traversing the same.

The guide ring 38 of the guide assembly 36 is maintained in rigid spaced relationship with a peripherally-apertured feed ring 40 by means of connecting straps 42. The straps are of substantially L-shaped configuration and joined to outer peripheral portions of the guide ring 38 and the feed ring 40 of the guide assembly 36. The stationary guide assembly, similarly to feed ring 26, is securely fixed to the tubular member 32 and is immovable relative to the same.

Following threading of the glass filaments through feed ring 26, rotatable tensioning ring 30 and the two ring members of the stationary guide assembly 36, the filaments are clamped about the periphery of an anchor ring 44, most clearly seen in FIG. 3. FIG. 3 comprises an enlarged view of the anchor ring 44 and its associated parts.

Anchor ring 44 comprises a split clamp which is readily placed in locking relationship about the periphery of an underlying rigid support ring 46, having disposed about the outer circumference thereof a rubber filament-engaging member 48. The roving ends 50 threaded through the various rings of the feed and tensioning assembly are uniformly disposed around the periphery of the rubber member 48.

Outer clamp or anchor ring 44 tightly compresses the peripherally-arranged filaments 50 against the underlying resilient ring 48, firmly locking the filaments 50 between inner ring 46 and overlying clamp ring 44. When this latter step has been completed, the glass filaments extending from the stationary feed ring to the anchor ring 44 are in horizontal relationship and ready to be moved over the periphery of the mandrel 18 of the rotatable mandrel assembly 12.

Movement of the anchor ring over the periphery of the mandrel 18 may be effected by means of a pivotally mounted ring support 52. The support may be carried by movable cart 54 of the resin dispensing and spiral roving dispensing assembly 16, clearly seen in FIG. 1. The ring support 52 possesses hook-like terminal end limits 56 which are adapted to engage eyes 58 diametrically disposed on the outer periphery of the anchor ring 44. Cart 54, after the ring support 52 has engaged the anchor ring 44, may move along the length of the mandrel assembly 12 simultaneously forming a longitudinal sock as the ring moves to the right-hand end limit of the mandrel assembly 12 illustrated in FIG. 1.

The anchor ring 44 is moved by the cart 54 until it has slidably moved over outwardly biased stop fingers 60 of resiliently-mounted stop 62 mounted on the right-hand end portion of the mandrel asembly 12, as viewed in FIG. 1. As will be more clearly seen from FIG. 6, the anchor ring stop 62 comprises a substantially frusto-conical housing 64 having a ring-like end limit 66 adapted to slidably engage a reduced mandrel portion 68, as is indicated in FIG. 5. The right-hand end portion of the conical housing 64 is welded or otherwise suitably affixed to a plurality of connecting straps 70 which are joined at their opposed end limits to a ring 72 slidably engaging the outer periphery of the right-hand end portion of the mandrel, as is also more clearly seen in FIG. 5.

Pivotally mounted and peripherally spaced about the housing 64 of the stop 62 are the stop fingers 60. Each finger 60 has an elongate leg portion 74 formed integrally with a foot portion 76 which in the normal position is disposed substantially at right angles to the longitudinal axis of the underlying mandrel 18.

Each stop finger 60 is pivotally mounted in a surface portion of the housing 64 by means of a pin 78 traversing one end portion of the finger leg 74 which is pivotally moveable in openings 80 formed in the periphery of the housing 64. Openings 82 in the housing periphery allow penetration of the stop foot portion 76.

Each foot portion 76 is hollow, as is more clearly seen in FIG. 6, for reception of a pin 84, having mounted on a lower end portion thereof spring member 86. Spring 86 is retained between a washer 88 secured to the distal end of each foot 76, which prevents passage of the stop finger foot portion 76 through the opening 82, and enlarged base portion 90 of the pin 84. Base portion 90 is urged against underlying surface portion on the mandrel 18.

When the anchor ring 44 and its associated parts illustrated in FIG. 3 engage the outwardly-biased stop fingers 60, it first slidably engages the upwardly inclined leg portions of the stop fingers. The fingers 60 are then urged inwardly toward the underlying mandrel until the rings 46 and 44, having the roving ends secured therebetween, pass the foot portions 76 of the stop fingers. This passage is readily detected by an audible "snap" as the stop fingers return to their extended positions, illustrated in FIG. 6, after they have left engagement with the ring 46 of the assembly illustrated in FIG. 3.

The ring 44 and its associated parts will then be in the position illustrated in dotted lines in FIG. 5, in which position the longitudinal filaments 20 are ready for tensioning.

In the tensioning step, the rotatable tensioning ring 30 is rotated relative to the tubular member 32 on which mounted. Rings 44 and 46 are then drawn tight against the stop fingers 60 of the stop 62 as the slack in the filaments extending from the tensioning ring 30 to the anchor ring 44 is taken up and twisted about the tubular surface portions 32 of the feed and tensioning assembly 10.

Twisting of the rotatable tensioning ring may be done either mechanically or manually. If done mechanically, a tension-regulating member may be disposed in the interval between ring 66 of the stop 62 and the enlarged ring member 92 fixedly mounted on the mandrel 18 adjacent reduced mandrel portion 68.

Interposed between the enlarged ring 92 and the ring portion 66 of the stop 62 is a coil spring 94 which may be covered by a flexible covering 97, illustrated in FIG. 5. As the rotatable tensioning ring 30 tensions the filaments 20 in the assembly 20 disposed about the mandrel 18, anchor ring 44 pulls the movable stop 62 in opposition to the coil spring 94 which biases the movable stop in a direction away from the feed and tensioning assembly 10, illustrated in FIG. 1. The tensioning ring 30 is rotated until the stop 62 has been urged to a desired degree against the coil spring 94 which may be determined by gauge, or which may be determined by feel manually, as the ring 30 is twisted. The tensioning ring 30 is locked in position by means of a bar or equivalent braking means. The brake may engage the members 34 disposed about the periphery of the ring so that a fixed tension is maintained in all of the longitudinal strands of the sock 20.

Following tensioning of the filaments, a second anchor clamp 44a disposed beside ring 40 of guide assembly 36 locks the filaments in desired peripheral arrangement about a ring and resilient member similar to elements 46 and 48 illustrated in FIG. 3. A smaller clamp 45 disposed at the left-hand end limit of mandrel 18 also locks the filaments in place over a rubber member snugly disposed on the mandrel. The filaments extending between anchor clamp 44a and clamp 45 may then be cut permitting the mandrel 18 to rotate independently of any attachment to the assembly 10. Anchor clamp 44a is then ready to be moved out to the position of ring 44 shown in FIG. 1 when a new sock 20 is desired.

As was above indicated, following the arrangement of the sock assembly 20 about the mandrel 18, the resin-dispensing assembly 16 is longitudinally moved along the length of the sock 20, dispensing resin from tube 96 secured to carriage 54. Resin and hardener, such as epoxy resin and triethylene tetramine, are dispensed into the upper portion of the tube 96 by means of the nozzles 98 through which the resin and hardener are forced by means of proportioning pumps well known in the art. If more than one pipe is being formed, a twin resin-dispensing tube 96a may be employed, as illustrated in FIG. 1.

The center of the sock 20 is clamped to a center retention ring 100 by a clamp 102, more clearly seen in FIG. 1, prior to any rotational movement of the mandrel after the strands of the sock 20 are tensioned. As the mandrel 18 rotates, the individual rovings of sock 20 are subjected to centrifugal forces tending to cause maximum "fly out" in the vicinity of the sock center.

By securing the central portion of the longitudinal sock 20 to retention ring 100, which is slidably movable over the mandrel 18, with the assistance of an overlying clamp 102, centrifugal forces exerted on the filaments of the sock 20 are overcome. In addition, the desired parallel arrangement of the filaments of the sock 20 relative to the underlying mandrel surface 18 is preserved.

In addition, none of the filaments are allowed to become loosened at their opposed end limits. The filaments are also prevented from engaging underlying uncured resin and hardener disposed on the mandrel surface. Non-engagement between the filaments of the sock 20 and the underlying resin-covered mandrel prevents filament entanglement in the hardening resin and facilitates the maintenance of the filaments of the sock 20 in desired parallel relationship. Straightening of the filaments by the apparatus operator which had heretofore been necessary when the central portion of the sock 20 was allowed to "fly out," as well as other difficulties encountered as a result of centrifugal forces exerted on the rotated filaments, is thus eliminated by use of the ring 100 and clamp 102.

Following the dispensing of resin and hardener along the length of the longitudinal sock 20, a loose spiral 22 is passed about the periphery of the filament sock 20 spaced about the mandrel 18. The spiral 22 pulls the roving strands against the mandrel surface and further increases the tension in the filaments and also insures locking of the longitudinal filaments of the sock 20 in desired parallel relationship with the longitudinal axis of the underlying mandrel.

FIG. 1 illustrates the carriage 54 of the assembly 16 in the course of applying a loose spiral 22 to the rotating strand sock 20 as the carriage 54 moves to the left along the tracks 106. The loose spiral 22 may be formed from the roving spool 110 rotatably mounted on the carriage 54. More than one spool 110 may be mounted on the carriage if desired to expedite the application of spiral roving wraps to the mandrel 18. Carriage 54 may be driven by a reversible motor which rotates a screw member 108 traversing carriage 54 and engaging threaded fittings thereon. Other equivalent means may be employed to reciprocally move carriage 54 along the length of the mandrel assembly 12.

When the tie-down spiral 22 approaches the retention ring 100, clamp 102 is released and ring 100 slidably moved over the mandrel to the left-hand end portion of the sock assembly adjacent the clamp 44a. It will be noted from FIG. 4 that inasmuch as the left-hand terminal end of the formed pipe will be in the vicinity of the spirals 112 which are applied over the longitudinal sock 20, retention ring 100 may subsequently be cut free from overlying filaments 114. Filaments 114 are cut after the sock 20 has been tied and anchored in place by a locking spiral; the ring may then be brought back out to the center of the mandrel when a subsequent longitudinal sock is in place.

Following application of the tie-down layer 22, the tight spiral wrap 24, illustrated in FIG. 2, is formed over the mandrel. After the appropriate number of spiral wraps 24 has been formed, another longitudinal sock 20 is placed over the mandrel by moving clamp 44a onto stop 62 after first releasing the anchor ring 44. Ring 44 may then be moved onto the straps 70, more clearly seen in FIG. 5, so that new anchor clamp 44a may be moved against the spring-biased stop fingers 60 and another clamp 45 locked in place, as illustrated in FIG. 1.

The foregoing description has made apparent the fact that desired uniform tension will be imparted to all filaments of the longitudinal socks 20 placed over the mandrel 18. The tension is made possible by the novel stop assembly 62, which is resiliently biased away from the tensioning assembly by means of the coil spring 94. Also, the novel retention ring 100 utilized when the longitudinal socks 20 are rotated in the course of receiving saturating resin and hardener, assists in the effecting of maximum tension on the individual filaments of the sock 20. The ring 100 also insures the fact that desired parallel arrangement of the filaments of each sock 20 is maintained.

It should be noted that enlarged ring 92 which butts against coil spring 94 has a central annular recess 93. The recess has the specific purpose of allowing a cutting blade to cut filaments disposed over the annular recess 93 without engaging a metallic surface. The ring thus serves as an indicator, revealing where the right-hand end of the pipe which is ultimately formed may be most readily separated from the mandrel assembly.

Since any pipe portion formed to the right of the ring 92 is discarded, care is thus taken to commence all spiral windings at the ring 92. Following desired build-up of the pipe over the mandrel 18 of the assembly 12, the mandrel assemblies are disengaged from the mandrel drive unit 14 by withdrawing the latter unit from engagement with the right-hand end portions of the mandrels, after the mandrels have been suitably supported on a temporary stand.

After removal of the drive unit 14, the left-hand portions of the mandrels may be withdrawn outwardly from the collets 20 of the feed and tensioning assemblies 10. The left-hand end portions of the mandrel assemblies are also suitably supported on a stand or the like during the latter step. The mandrel assemblies with the pipes formed thereon are then removed to a curing chamber wherein curing of the resin component of the formed pipe is completed as the uncured pipes are rotated to insure uniformity of composition and hardness.

The cured pipes are then separated from the mandrels, after which the desired pipe finishing operations may be completed. After the assemblies 12 have been removed from the feed and tensioning assembly 10 and the drive units 14, new mandrel assemblies 12 are readily attached to the collets 20 and the drive units 14, and the above-described pipe-forming operations may be repeated.

The foregoing description is of apparatus particularly adapted to form filament-reinforced pipe members in which the longitudinal filament reinforcements are possessed of a maximum tension and in which such tensions are uniformly imparted to the various filaments disposed about the pipe periphery. The apparatus described, although composed of individually simple elements, provides pipes of exceptional strength.

In conducting pressure tests and more specifically "weep" tests on reinforced plastic pipe made in accordance with this invention, a startling improvement in pipe strength was revealed.

In the course of conducting the tests, four-foot specimens were selected from the middle and opposed ends of the pipe being tested. The ends of the four-foot specimens were then capped and subjected to increasing hydraulic pressure at a uniform test temperature, using pressure increments of 100 p.s.i. at five minute intervals. When one drop of water appeared on the surface of the specimen, the test was discontinued and the pressure attained, as evidenced by a pressure-indicating device, comprised the "weep" or failure pressure.

Utilizing pipe specimens formed by the above-described apparatus wherein the horizontal filamentous reinforcements are retained in fixed spaced relationship with the mandrel center, average improvements in "weep" pressure of in excess of 20 percent have been realized over specimens in which unrestrained longitudinal filaments were allowed to balloon out at the mandrel center. It is believed that this significant increase in strength is an obvious indication of the inventive nature of the process and apparatus above disclosed.

Although the above description has been directed to the use of glass roving filaments embedded in epoxy resin, it should be noted that such description is given by way of example only. Other reinforcing filaments, such as nylon and filaments formed from other synthetic plastics, may also be employed in the process above disclosed. Other hardenable resinous materials such as polystyrene may be substituted for epoxy in the process above disclosed.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:
1. In an apparatus for forming filament-reinforced resin tubular members having longitudinal filamentous reinforcements, the combination comprising a form for a tubular member; anchor means engaging one longitudinal end limit of said reinforcements, stop means for said anchor means disposed adjacent one end limit of said form, means resiliently biasing said stop means in a direction away from a second end limit of said form oppositely disposed to said one end limit; and means adjacent said second end limit of said form for pulling said anchor means, by means of said filamentous reinforcements, against said stop means in opposition to the biasing means and toward said second end limit whereby said filamentous reinforcements are placed under tension.

2. The apparatus of claim 1 in which said form is rotatable and in combination with means for fixing substantially the center portion of said filamentous reinforcements in spaced relation with said form after said reinforcements are placed under tension.

3. In an apparatus for forming elongate tubular resin members having filamentous reinforcements, the combination comprising a form for said elongate members, a source of filamentous reinforcements, anchor means for engaging one end limit of a plurality of filamentous reinforcements, stop means for said anchor means disposed adjacent a first end limit of said form; said stop means having outwardly biased projections permitting slidable movement of said anchor means thereover in one direction only; and pulling means disposed adjacent a second end limit of said form for pulling said plurality of filamentous reinforcements secured to said anchor means against said stop means in the direction of said second end limit of said form.

4. The apparatus of claim 3 in which said pulling means includes an apertured ring traversed by said filamentous reinforcements arranged in axial alignment with said anchor means and cooperating therewith for maintaining filamentous reinforcements extending between said pulling means and anchor means in desired surrounding relation with said form; said pulling means also including means interposed between said source of filamentous reinforcements and said apertured ring for twisting portions of said filamentous reinforcements between said source and said apertured ring about an axis passing through said anchor means and said apertured ring whereby portions of said filamentous reinforcements extending between said apertured ring and said anchor means are placed under tension and said anchor means is pulled against said stop means in the direction of said apertured ring.

5. The apparatus of claim 4 in which said stop means is resiliently biased in a direction away from the twisting means for said filamentous reinforcements.

References Cited

UNITED STATES PATENTS

| 3,202,560 | 8/1965 | Michael | 156—162 XR |
| 3,031,361 | 4/1962 | Strickland | 156—175 XR |
| 2,987,100 | 6/1961 | Strickland et al. | 156—433 XR |

PHILIP DIER, *Primary Examiner.*

U.S. Cl. X.R.
156—162, 433